United States Patent [19]

Hartness et al.

[11] Patent Number: 4,709,536
[45] Date of Patent: Dec. 1, 1987

[54] ARTICLE TRANSPORT APPARATUS

[75] Inventors: Robert G. Hartness, Greer; Thomas S. Hartness, Greenville, both of S.C.

[73] Assignee: Hartness International, Inc., Greenville, S.C.

[21] Appl. No.: 7,795

[22] Filed: Jan. 28, 1987

[51] Int. Cl.[4] ................... B65B 35/36; B65B 35/44; B65B 39/02
[52] U.S. Cl. .................................. 53/539; 53/247; 53/543
[58] Field of Search ............... 53/539, 543, 247, 248, 53/251, 261, 262

[56] References Cited

U.S. PATENT DOCUMENTS

| | | | |
|---|---|---|---|
| 2,784,997 | 3/1957 | Baumann | 294/88 |
| 2,819,576 | 1/1958 | Hendricks et al. | |
| 3,057,136 | 10/1962 | Walter | 53/262 |
| 3,273,723 | 9/1966 | Andersen | |
| 3,325,967 | 6/1967 | Wild | 53/262 |
| 3,327,450 | 6/1967 | Carter | |
| 3,353,331 | 11/1967 | Rowekamp | 53/539 |
| 3,561,189 | 2/1971 | Raudat | 53/539 X |
| 3,570,216 | 3/1971 | Frentzel | 53/539 X |
| 3,592,002 | 7/1971 | Alduk | 53/539 |
| 3,788,034 | 1/1974 | Hartness et al. | 39/2 |
| 3,965,650 | 6/1976 | Nussbaum | |
| 4,176,425 | 12/1979 | Trutzschler | 19/81 |
| 4,300,330 | 11/1981 | Hartness | 53/539 |
| 4,486,045 | 12/1984 | Trygg | 294/87 |
| 4,522,011 | 6/1985 | Bauers et al. | 53/247 X |

Primary Examiner—Horace M. Culver
Attorney, Agent, or Firm—Dority & Manning

[57] ABSTRACT

In a case packing machine, an article transport apparatus for transporting groups of containers from a continuously-running infeed conveyor of the case packing machine to a case loading station. The article transport apparatus includes a reciprocating carriage having longitudinally extending bladders which are inflatable for gripping a group of containers to the carriage. The reciprocating carriage moves upstream to encompass a group of containers, and upon inflation of the bladders, the bladders grip the group of containers to the carriage. The carriage then moves downstream, and upon deflation of the bladders, deposits the group of containers at the loading station. As the reciprocating carriage moves away from the infeed conveyor towards the loading station, a space free of containers, or gap, is created temporarily on the infeed conveyor, through which a pivoting stop bar arrangement pivots upwardly from below the infeed conveyor to a position above the infeed conveyor for restraining the containers on the feed conveyor. The pivoting stop bar arrangement restrains the containers on the infeed conveyor until the reciprocating carriage returns to grip another group of containers. Individual lane conveyors are provided between conveyor lane dividers which allow the conveyor lane dividers to be supported from lower portions thereof.

24 Claims, 14 Drawing Figures

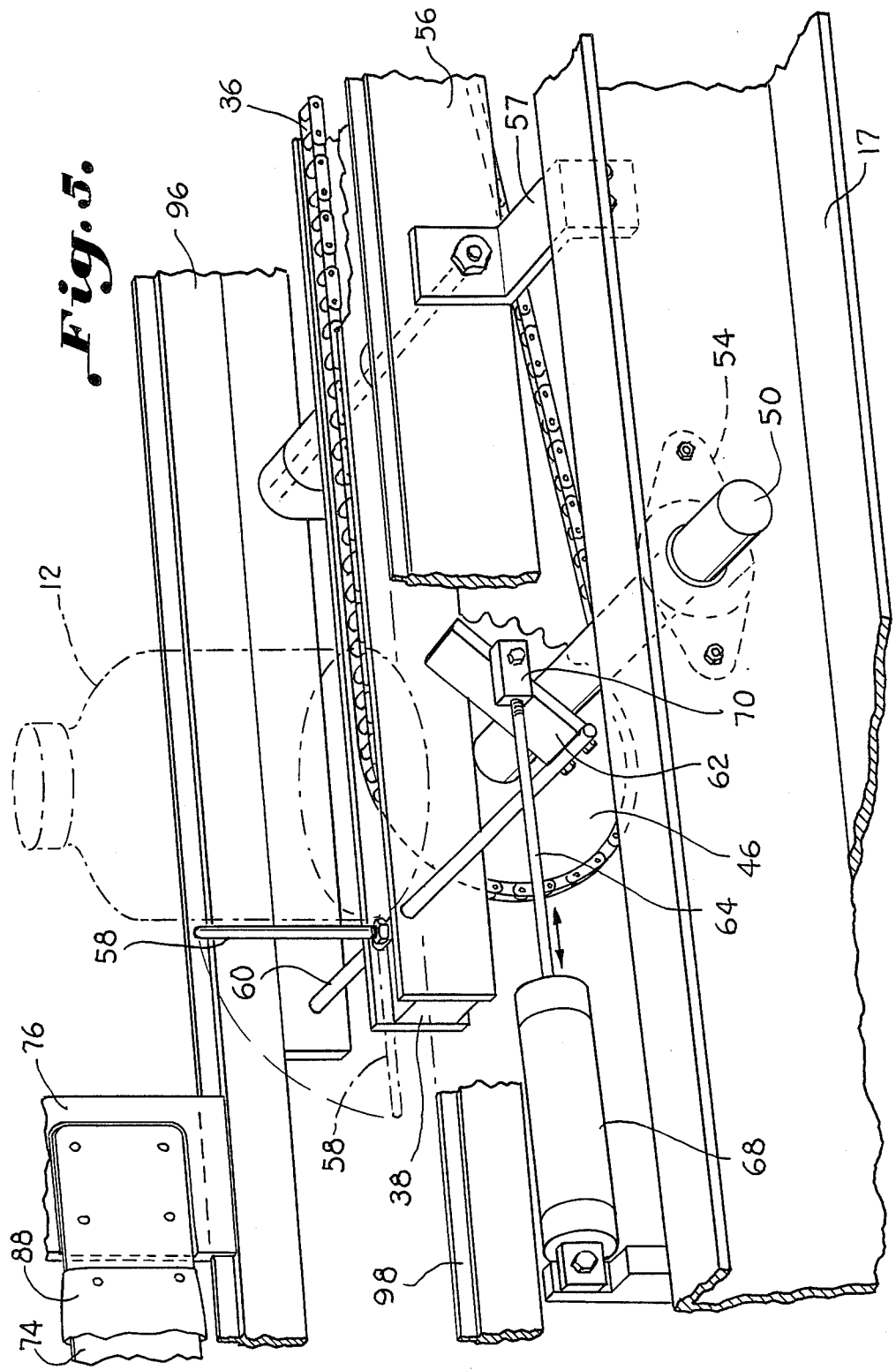

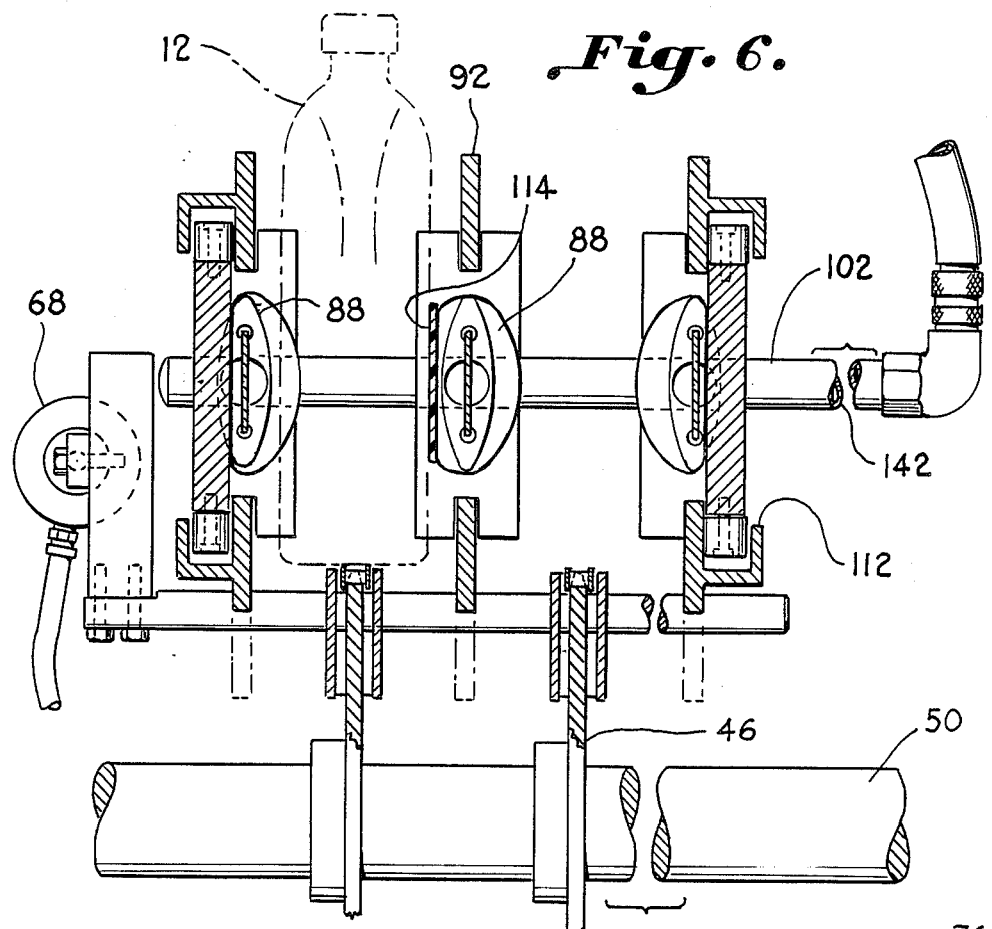

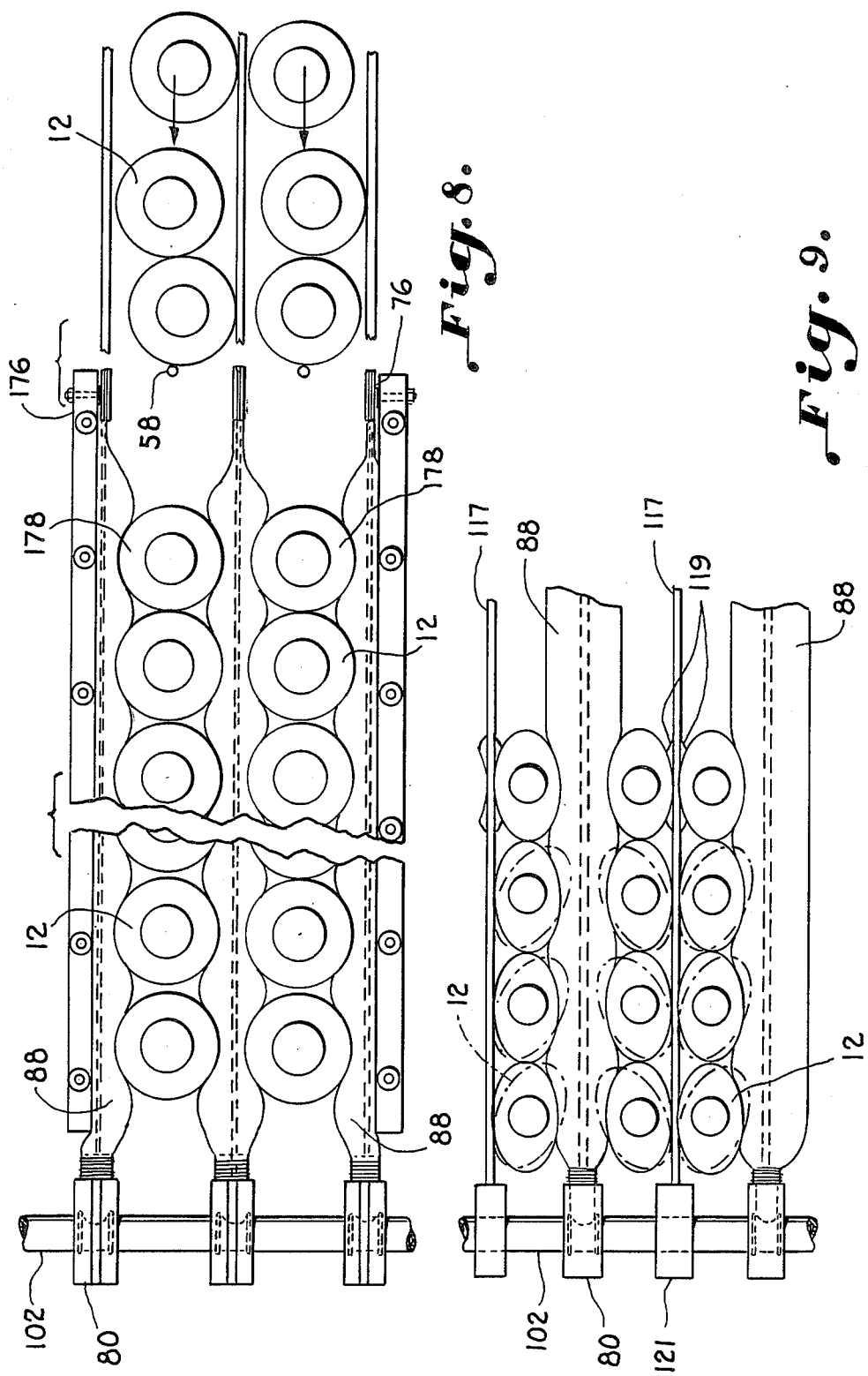

ARTICLE TRANSPORT APPARATUS

BACKGROUND OF THE INVENTION

The present invention relates generally to case packing machines, and more particularly to case packing machines where containers or other articles are transferred from an infeed conveyor to a case loading station.

Case packing machines for packing bottles or other containers into compartmentalized and non-compartmentalized cartons are widely used. Typically, such case packing machines utilize a continuously-running infeed conveyor belt to advance the containers in side by side rows to a dead plate adjacent a loading station. From the dead plate, the containers are moved to the loading station. Once the containers are moved to the loading station, they are aligned in a grid structure, which commonly employs actuatable bars which support the containers immediately before being loaded into a case. Upon actuation of the bars, the containers are dropped as a group into the case positioned below the loading station.

Packing of the containers into the grid structure from the dead plate is usually done intermittently. Consequently, those containers positioned on the dead plate during the time between intermittent loadings of the grid structure experience line pressure exerted by upstream containers still being advanced by the continuously-running infeed conveyor belt. The line pressure, when exerted on the containers positioned on the dead plate, can result in undesirable distortion, jamming, or even breakage of containers, especially odd-shaped, flexible, or slender profiled containers, making difficult the correct loading of the grid structure with the containers. Such creates special problems in that, today, shapes of containers are consistently being changed from the traditional round shape to triangular, rectangular, square, or oblong shapes and the like. Further, because of the increased use of plastic containers, the problem with containers compressing and deforming under the influence of upstream conveyor line pressure is increased.

One particular problem arises with the packing of flask or oval-shaped containers. With these type of containers, there is a tendency for the narrow sides of adjacent containers to overlap each other or "shingle", causing the containers to become disordered. Because the containers to be packed are typically transported through walled lanes for maintaining the containers in rows, if the disordered configuration or "shingling" occurs, the containers may force outwardly on the walled lanes, causing the walls of the lanes to bulge such that containers transported in adjacent lanes are impeded to the point that they may no longer move. In such a situation, the lanes adjacent the dead plate area will become jammed such that the packing machine must be shut down in order for the situation to be alleviated.

Various case packing machines have been patented for transferring containers from an infeed conveyor to a case loading station. U.S. Pat. No. 3,273,723, granted to Andersen, discloses a packing machine having a bottle gripping head for gripping the upper portions of bottles on a conveyor and for transporting the bottles from the conveyor to a packing case. U.S. Pat. No. 3,327,450, granted to Carter, discloses a case packer having a pickup head equipped with vacuum cups for transporting containers from a conveyor to a case packing station. U.S. Pat. No. 3,965,650, granted to Nussbaum, discloses a case packing machine having a removable drop plate assembly disposed beneath containers transported by a conveyor such that after the conveyors have advanced to a pre-packing staging position, the drop plate assembly is shifted for allowing the containers to fall into an underlying carton. And, U.S. Pat. No. 4,457,121, granted to Johnson et al., discloses a bottle packing machine having a rotating grid structure which receives containers from a conveyor and transfers them downwardly into a case.

Other types of container transport devices include inflatable gripping assemblies. One such assembly is disclosed in U.S. Pat. No. 2,784,997, granted to Baumann. Another such assembly is the Schaberger Pneumagrip manufactured by Pneumatic Scale Corporation of Quincy, Massachusetts. However, these devices are for depalletizing containers, not for transferring containers from an infeed conveyor to a case loading station.

SUMMARY OF THE INVENTION

It is an object of the present invention to provide a packing machine for automatically and efficiently packing containers in cases.

Another object of the present invention is to provide an article transport apparatus for transporting articles from an infeed conveyor to a loading station.

Another object of the present invention is to provide an article transport apparatus which eliminates overlapping of containers transported thereby.

Another object of the present invention is to provide an article transport apparatus having gripping means configured to inherently grip a predetermined number of containers for transport with the article transport apparatus.

Another object of the present invention is to provide an article transport apparatus which eliminates the need of a conventional dead plate normally associated with an infeed conveyor.

Another object of the present invention is to provide an article transport apparatus having gripping means which can readily grip articles of various shapes and sizes.

Another object of the present invention is to provide an article transport device which eliminates the need for actuatable container support bars in the grid structure.

Still another object of the present invention is to provide an article transport apparatus which is of relatively simple construction.

Yet another object of the present invention is to provide an article transport apparatus which allows for an increased rate of packing of containers per a specified conventional input conveyor rate.

Generally, the present invention includes a case packing apparatus for loading groups of articles into cases. The case packing apparatus comprises conveying means for supplying a plurality of articles in a plurality of aligned rows in a predetermined direction. A receiving station receives articles supplied by the conveying means in the plurality of aligned rows, and a loading station is provided for loading articles in the plurality of aligned rows into cases. A carriage moveable between the receiving station and the loading station carries articles in the plurality of aligned rows from the receiving station to the loading station, the carriage defining a receiving end having article passageways through which articles may be received. Carriage transfer means move the carriage to a receiving position in a direction opposite the predetermined direction of the flow of articles supplied by the conveying means for causing the receiving end of the carriage to receive articles, thereby allowing the carriage to encompass a predetermined number of articles at the receiving station. Article engagement means carried by the carriage selectively engage articles encompassed by the carriage substantially fix the articles to the carriage for movement therewith. The carriage transfer means moves the carriage to the loading station in substantially the predetermined direction of the flow of articles supplied by the conveying means, after engagement of the article engagement means with the articles encompassed by the carriage. Means are provided for disengaging the article engagement means for depositing articles carried by the carriage at the loading station. And, loading means associated with the loading station load the articles deposited at the loading station into cases. More specifically, substantially the entire motion of the carriage between the receiving station and the loading station is generally rectilinear and is accomplished by reciprocating actuation means attached to the carriage.

The article engagement means includes actuatable longitudinally extending gripping means attached to the carriage for receiving the articles, the actuatable longitudinally extending gripping means, upon actuation thereof, gripping the articles in the plurality of aligned rows for substantially fixing the articles with respect to the carriage. The longitudinally extending gripping means preferably include fluid pressurizable means which engage, upon pressurization thereof, the articles for substantially fixing the articles with respect to the carriage, thereby allowing movement of the articles with the carriage. The fluid pressurizable means allow, upon depressurization thereof, for the carriage to move relative to the articles. The fluid pressurizable means are pressurized when the carriage is at the receiving station and depressurized when the carriage is at the loading station.

Pressurization of the pressurizable means is preferably accomplished by a first pressurized fluid source of a first predetermined pressure and a second pressurized fluid source of a second predetermined pressure, the first predetermined pressure being of higher pressure than the second predetermined pressure. The first pressurized fluid source is for initial pressurization of the fluid pressurizable means upon the carriage moving into proximity with the receiving station, and the second pressurizable fluid supply source is for pressurization of the fluid pressurizable means after the initial pressurization of the fluid pressurizable means by the first pressurized fluid source. Depressurization of the pressurizable fluid means includes depressurization means having a fluid receiver communicating with the fluid pressurizable means for depressurizing the fluid pressurizable means by receiving the pressurized fluid therefrom upon the carriage moving into proximity with the loading station.

Pivoting stop means are associated with the conveying means for pivoting through an arcuate path to contact the articles for restraining movement thereof by the conveying means. The pivoting stop means pivot between a restraining position for the contact with the articles and a retracted position away from the conveying means for allowing the articles to be transferred by the conveying means. Actuation means are attached to the pivoting stop means for pivoting the pivoting stop means in the arcuate path between the restraining position and the retracted position. The movement of the carriage provides a gap in the flow of articles transferred by the conveying means through which the pivoting stop means may pivot generally unimpeded for contacting the articles. The pivoting stop means is situated generally below the conveying means when in the retracted position and generally above the conveying means when in the restraining position, the pivoting stop means being pivoted upwardly from the retracted position in the arcuate path to the restraining position.

A plurality of partitions may be associated with the receiving station for defining a plurality of individual lanes. An endless conveyor member is provided in each of the plurality of individual lanes which extends between the partitions defining the individual lanes. The endless conveyor member frictionally contacts the articles for transporting the articles thereon along the individual lane in which the endless conveyor member is provided. Drive means are connected to each endless conveyor member for moving the endless conveyor member along the individual lane associated therewith. Means are provided for rigidly fixing lower portions of the partitions with respect to one another for allowing the articles to be freely transported between the partitions by the endless conveyor members. Preferably, the endless conveyor members are roller chains.

While the applicant is not aware of pressurizable means for use with a carriage as disclosed, applicant has knowledge of a machine whereby an inflatable device is used to force articles traveling single-file on a conveyor against a fixed surface for stopping and starting the flow of the articles by the conveyor. The applicant considers the present invention fully patentable over this inflatable device and the patented devices cited above.

BRIEF DESCRIPTION OF THE DRAWINGS

The foregoing as well as other objects of the present invention will be more apparent from the following detailed description of the preferred embodiment of the invention, when taken together with the accompanying drawings, in which:

FIG. 5 is a fragmentary perspective view of a pivoting stop means assembly constructed in accordance with the present invention;

FIG. 6 is a cross-sectional view of a portion of the article transport apparatus taken along line 6—6 of FIG. 2;

FIG. 7 is a partial perspective view, with parts cut away, of pressurizable means constructed in accordance with the present invention;

FIG. 8 is a fragmentary plan view of an article transport apparatus having pressurizable means constructed in accordance with the present invention;

FIG. 9 is a partial plan view of an alternate embodiment of pressurizable means constructed in accordance with the present invention;

DESCRIPTION OF THE PREFERRED EMBODIMENT

Figure 1:
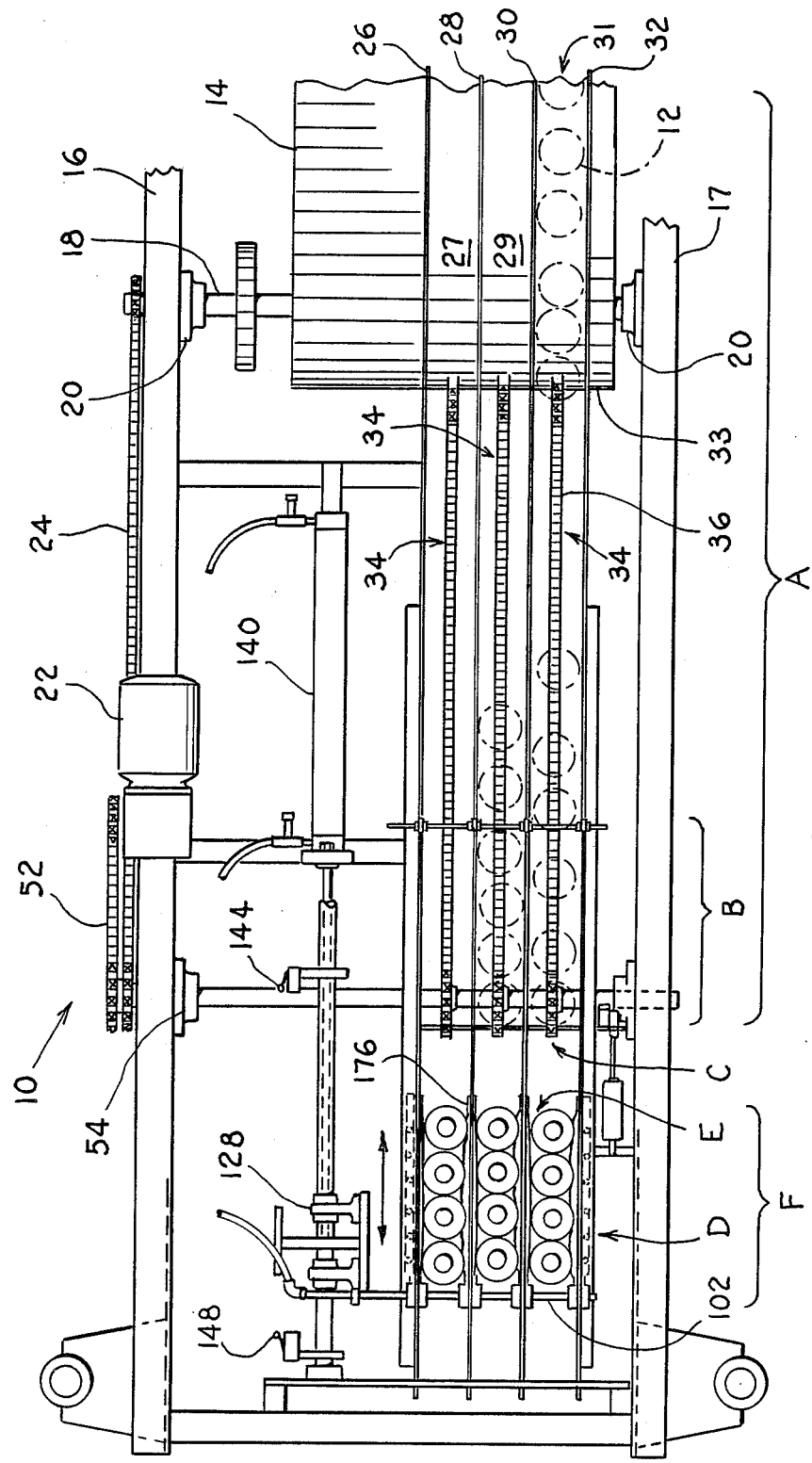
FIG. 1 is a plan view of an article transport apparatus constructed in accordance with the present invention.

Referring to the drawings in detail, wherein like reference characters represent like elements throughout the various views, a case packing machine is illustrated in FIG. 1 and is designated generally by the reference character 10. Case packing machine 10 includes conveying means generally A, a receiving station generally B, container stop means generally C, a carriage generally D, article engagement means generally E attached to carriage D, loading station generally F, and loading means generally G. Articles or containers 12 are transferred from an article supply source (not shown) by conveying means A to receiving station B. Once at receiving station B, stop means C move to a restraining position for restraining containers 12 from further movement by conveying means A. Carriage D then moves towards receiving station B and encompasses containers 12 at receiving station B. Upon encompassment of containers 12 by carriage D, engagement means E engage containers 12 at receiving station B to fix containers 12 with respect to carriage D. Stop means C move to a retracted position as carriage D moves away from receiving station B. After carriage D has moved away from receiving station B, stop means C move back to a restraining position to engage containers 12, which are constantly being supplied receiving station B by conveying means A, which is typically continuously moving. Carriage D then moves to loading station F with containers 12 being carried therewith. Once at loading station F, engagement means E release containers 12 into loading means G. After containers 12 have been released from carriage D by engagement means E at loading station F, carriage D returns to receiving station B to engage another group of containers 12 thereat.

Conveying means A includes a conventional conveyor belt 14 disposed between frame rails 16, 17 of case packing machine 10. Conveyor belt 14 is propelled by a drive shaft 18 which is mounted between frame rails 16, 17 with bearings 20. Drive shaft 18 is rotated by a motor 22 acting through a drive chain 24. Positioned above conveyor belt 14 are lane dividers 26, 28, 30, and 32. Lane dividers 26, 28, 30, and 32 define therebetween lanes 27, 29, and 31. Containers 12 are carried in a row by row ordered configuration by conveyor belt 14 in lanes 27, 29, and 31. While only three lanes have been shown, it is to be understood that a greater or lesser number of lanes could be provided without exceeding the scope of the present invention.

Figure 4:
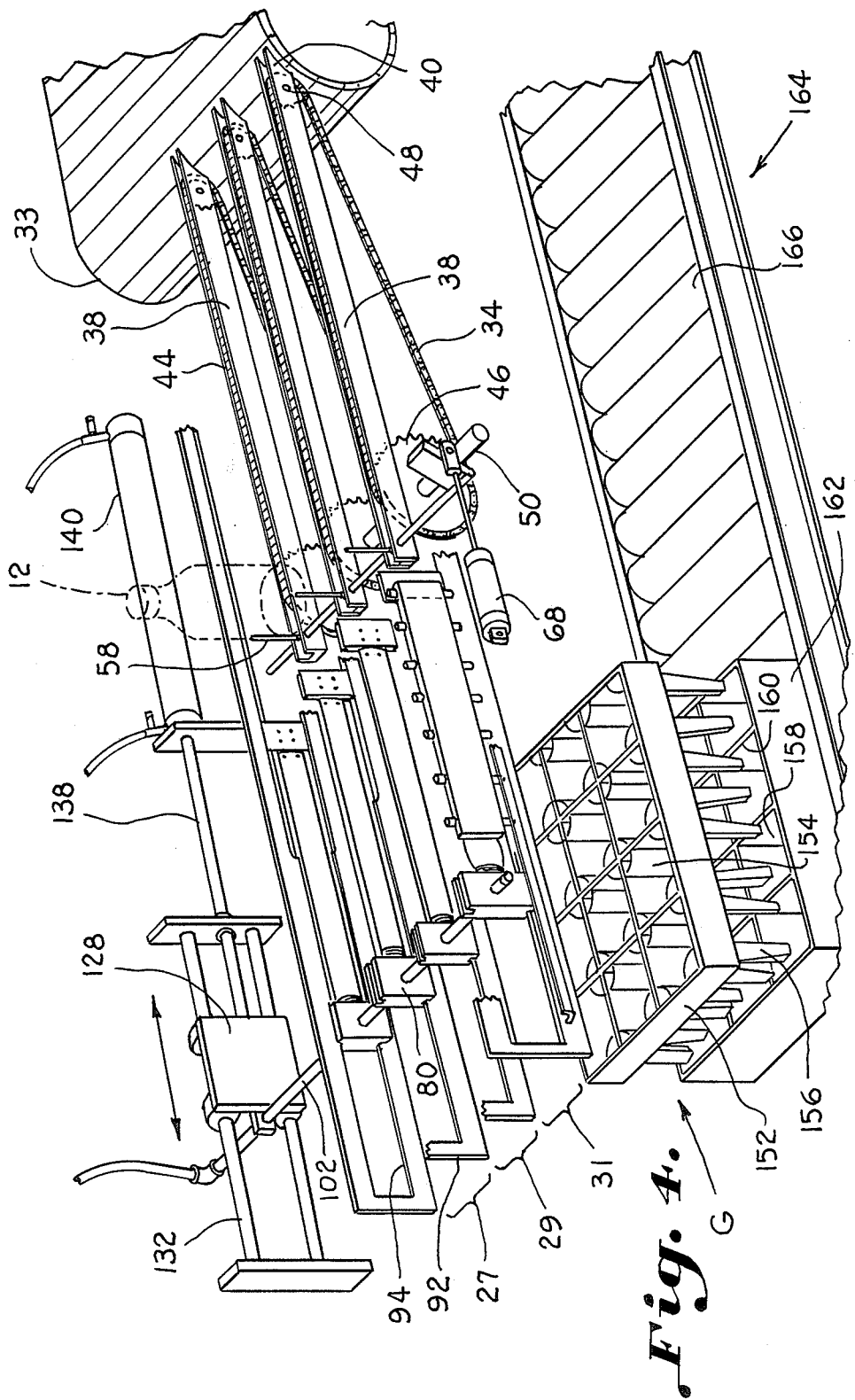
FIG. 4 is a perspective view of an article transport apparatus constructed in accordance with the present invention.

Provided at the terminus 33 of conveyor belt 14 are endless conveyor members 34 which extend in substantially the same direction as does conveyor belt 14. One endless conveyor member 34 is provided in each lane 27, 29, and 31 for frictionally contacting containers 12 for transporting containers 12 thereon along the individual lanes 27, 29, and 31, in which the endless conveyors 34 are provided. Each endless conveyor member 34 is preferably a roller chain 36, although other endless conveyor members such as belts, cords, and the like could also serve as endless conveyor members 34. As shown in FIG. 4, channel members 38 are provided endless conveyor members 34 for allowing endless conveyor member 34 to be carried therein. Channel members 38 are provided a tapered end 40 at one end thereof for placement adjacent the terminus 33 of conveyor belt 14. Containers 12 being transported by endless conveyor members 34 may slightly contact upper surfaces 44 of channel members 38 as containers 12 are propelled through the lanes 27, 29, and 31, but each endless conveyor member 34 projects slightly above upper surfaces 44 of channel members 38 to ensure sufficient contact with the bottoms of containers 12 for allowing transport thereof by endless conveyor member 34. Each endless conveyor member 34 is provided a driving pulley or sprocket 46 and a driven pulley or sprocket 48. Driven sprockets 46 are connected to a common drive shaft 50 which is drivingly connected to motor 22 by drive chain 52. Drive shaft 50 is supported between frame rails 16, 17 by bearings 54.

As shown in FIG. 5, use of endless conveyor members 34 for propelling rows of containers 12 through lanes 27, 29, and 31 allows for lane dividers 26, 28, 30, and 32 to be supported by lower portions 56 thereof by bracket assemblies 57 (only one shown). Since lane dividers 26, 28, 30, and 32 can be supported by lower portions 56 with bracket assemblies 57, instead of from above by a conventional overhead support structure as is ordinarily done, the lane dividers can be rigidly fixed with respect to one another such that should containers 12 in one lane jam, the lane dividers bordering that lane would be supported sufficiently such that those lane dividers would not bulge outwardly to impede flow of containers 12 in adjacent lanes. The provision of endless conveyor members 34 in individual lanes 27, 29, and 31 thus eliminates the need for an overhead support structure of lane dividers 26, 28, 30, and 32.

Receiving station B is approximated by the area above endless conveyor members 34 which is encompassed by carriage D when carriage D is at its furthermost portion over endless conveyor members 34. Containers 12 being transported by conveying means A are transported by conveyor belt 14 to endless conveyor members 34, which then transport containers 12 to receiving station B.

Figure 2:
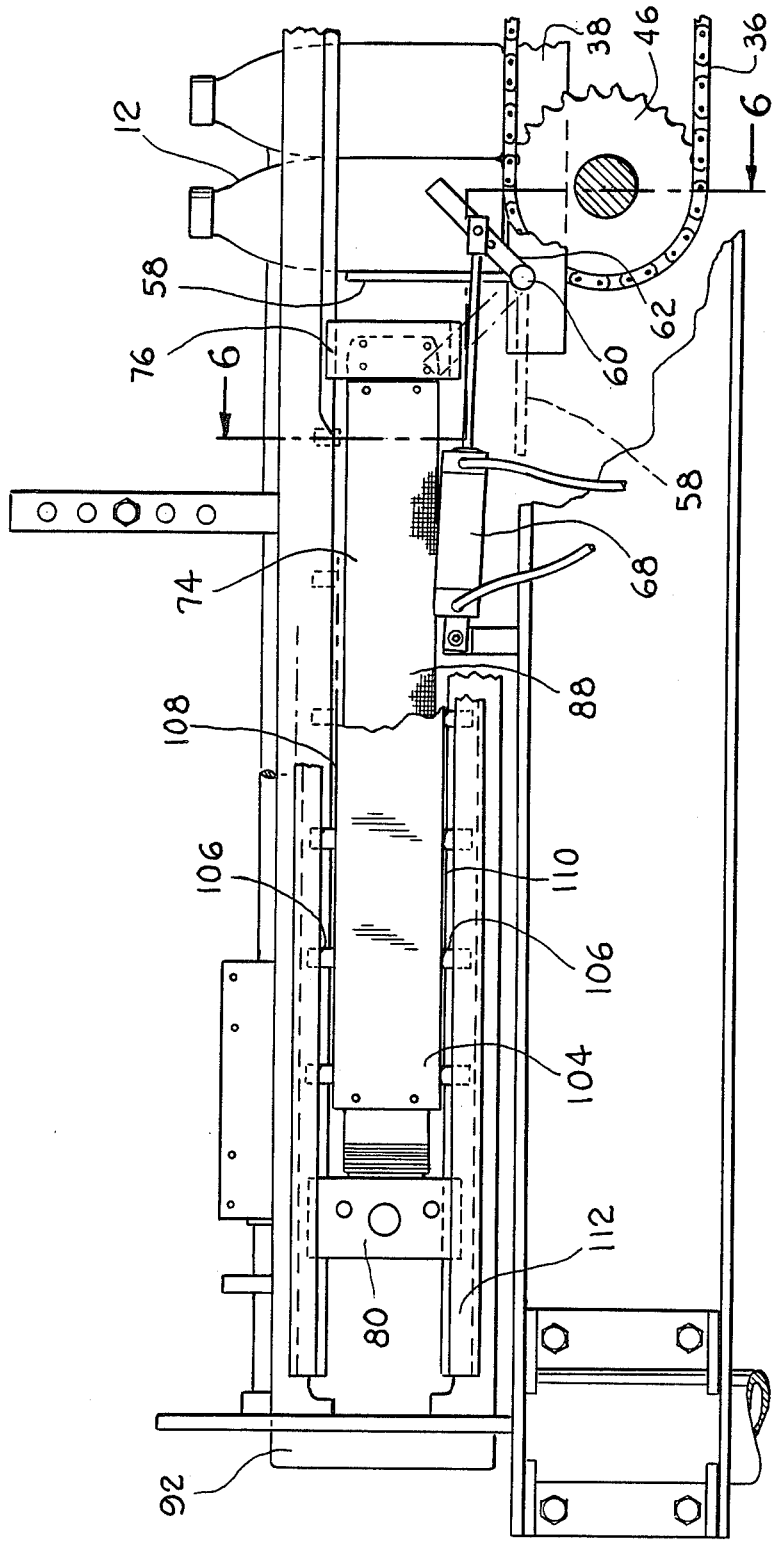
FIG. 2 is a partial side elevational view, with parts cut away, of an article transport apparatus constructed in accordance with the present invention.

Stop means C includes pivoting bars 58 which pivot from a retracted position, shown in phantom in FIGS. 2 and 5, to a substantially vertical container restraining position for restraining movement of containers 12 on endless conveyor member 34. When pivoting bars 58 are in the retracted position, containers 12 may pass over pivoting bars 58 relatively unrestrained. Pivoting bars 58 are connected to a common pivoting shaft 60 which has on one end thereof a flange 62 to which a shaft 64 of a double action pneumatic cylinder 68 is connected by means of a pivotal connector 70. Upon actuation of double action pneumatic cylinder 68, shaft 64 advances to cause pivoting shaft 60 to move pivoting bars 58 from the retracted position to the restraining position for restraining movement of containers 12 on endless conveyor members 34. Pivoting bars 58 are very versatile in that they can be used to stop a wide variety of container styles. It is to be understood that various other means could be provided for stopping movement of containers 12 on conveying means A, such as vertically reciprocating stop means (not shown) or laterally extending stop means (not shown) which would extend transverse to the flow of containers 12 for restraining movement thereof.

Carriage D includes interior frame members 72 and exterior frame members 74, as illustrated in FIGS. 2 and 7, which are preferably constructed of steel, although any other suitable material could be used. Each interior frame member 72 includes at one end thereof a sliding block 76 having upper and lower longitudinally extending grooves 78. Sliding block 76 is attached to interior frame member 72 by bolts, screws, rivets, or the like and is preferably constructed of brass, although any other suitable material could be used. Attached to the other end of interior frame member 72 is a sliding conduit block 80 having upper and lower longitudinally extending grooves 81 and internal passages 82. Sliding conduit block 80 is attached to interior frame member 72 by means of bolts 84 which extend longitudinally from interior frame member 72 and pass through sliding conduit block 80, extending outwardly from a rear portion thereof. Nuts 86 fix sliding conduit block 80 to interior frame member 72.

Encircling interior frame member 72 and extending substantially the length thereof is an airbag, or, fluid pressurizable bladder 88 for engaging, upon inflation thereof, the sides of containers 12. Bladder 88 is preferably constructed of fabric reinforced tubing having a slick surface finish, although any other suitable inflatable material could be used, such as rubber or the like. Bladder 88 is closed or sealed at one end of interior frame member 72 adjacent sliding block 76. At the other end of interior frame member 72, bladder 88 is attached to sliding conduit block 80 in a manner for communicating with internal passages 82 of sliding conduit block 80. Bladder 88 is illustrated as being attached to a collar portion of sliding conduit block 80 by the wrapping of cord 90 around the exterior surface of bladder 88 to bind bladder 88 to the collar for an air tight seal.

Vertical support members 92 are continuations of lane dividers 26, 28, 30, and 32 and are provided with slots 94 having rails 96 and milled rail portions 98 with which grooves 78 of sliding block 76 and grooves 81 of sliding conduit block 80 engage for sliding movement. Grooves 81 of sliding conduit block 80 engage rails 96 while grooves 78 of sliding block 76 engage milled rail portions 98. Each sliding conduit block 80 engages a conduit draw bar 102 such that when conduit draw bar 102 is moved towards and away from receiving station B, interior frame members 72 will also be moved towards and away from receiving station B via sliding movement of sliding blocks 76 and sliding conduit blocks 80 in rails 96 and milled rail portions 98.

Each exterior frame member 74 is provided a side plate 104 having perpendicularly extending rollers 106 extending from an upper side 108 and a lower side 110 thereof. Rollers 106 engage in channels 112 disposed outwardly of vertical support members 92. Other than the provision of side plate 104 and rollers 106, and the deletion of sliding block 76, exterior frame members 74 are substantially the same as interior frame members 72.

Side plate 104 of exterior frame member 74 allows for increased rigidity of exterior frame member 74 such that when bladders 88 are inflated, the tendency for exterior frame members 74 to bulge outwardly will be diminished.

Article engagement means E includes bladders 88 which, upon inflation thereof, engage articles or containers 12 disposed between frame members 72, 74 of carriage D. As shown in one lane only for illustrative purposes in FIG. 6, a bladder 88 disposed on one side of each lane 27, 29, and 31 can be provided with a slick finished member 114, such as a strip of nylon or the like, which extends substantially the length of the bladder 88 less the width of one container 12. Slick finished member 114 allows, upon inflation of bladders 88, for bladders 88 to grip the sides of containers 12 such that oval, rectangular, or flask-shaped containers 12 may move from an overlapping or "shingled" position to an ordered, aligned configuration, due to the relative difference of surface slickness between the bladder 88 provided the slick finished member 114 and the bladder 88 not so provided.

As shown in FIG. 9, in place of slick finished member 114, rail members 117 can be provided to the lanes alternatingly with bladders 88 instead of the bladder 88—slick finished member 14 arrangement of FIG. 6. Rail members 117 are attached by blocks 121 to conduit draw bar 102 and function similarly to slick finished members 114 to provide a relative difference of surface slickness to eliminate shingling of containers 12 upon inflation of bladders 88. Pads 119 may be provided on upstream portions rail members 117 to fixedly engage a reference container 115 in each lane upon inflation of bladders 88. The engagement of reference containers 115 allows containers 115 to be used as reference containers for setting up and monitoring case packing machine 10. Accordingly, it is desirable for containers 115 to remain stationary and for the linear expansion in the length of a row of containers 12, which inherently takes place upon the inflation of bladders 88 and corresponding removal of container overlapping or shingling, to occur downstream of reference containers 115.

Figure 10:
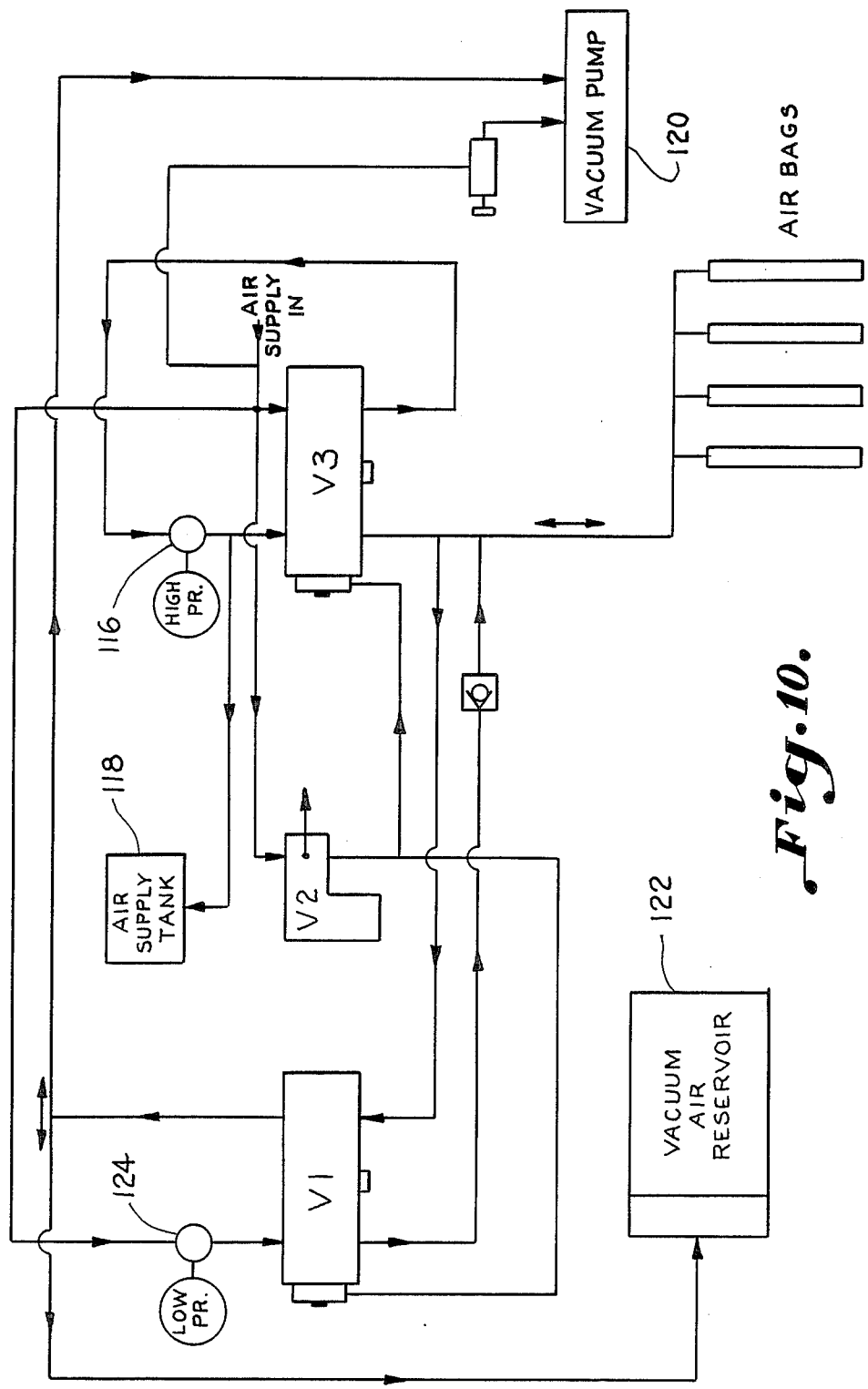
FIG. 10 is a schematic representation of means for pressurizing and depressurizing pressurizable means constructed in accordance with the present invention.

Article engagement means E also includes, as shown in FIG. 10, pressurization means and depressurization means. The pressurization means and the depressurization means include various conventional pneumatic, mechanical, and electrical components (not shown) and in particular, an air activated valve V1, an electrical solenoid valve V2, and an air actuated valve V3. Preferably while bladders 88 are deflated, high pressure compressed air enters de-energized valves V2 and V3 from a conventional compressed air source (not shown) and also passes through a high pressure regulator 116 to an air supply tank 118. Meanwhile, a vacuum pump 120 pulls air through valve V1 to keep bladders 88 in a deflated condition. Vacuum air reservoir 122 provides additional volume for the air vacuumed from bladders 88 by vacuum pump 120.

For inflation of bladders 88 by the pressurization means, valve V2 is energized, and valves V1 and V3 are actuated. Valve V3 discontinues flow of high pressure compressed air therethrough from the compressed air source to high pressure air supply tank 118 and allows high pressure compressed air to flow from high pressure air supply tank 118 to bladders 88 for rapid inflation thereof to a predetermined pressure of approximately two psi. Then, valve V1 allows compressed air to flow therethrough from a low pressure regulator 124 to bladders 88 for maintaining bladder 88 at approximately two psi. The depressurization means deflates bladders 88 upon the reaching of loading station F by carriage D by actuating valves V1, V2, and V3 such that vacuum pump 120 pulls air from bladders 88 to air reservoir 122. Meanwhile, high pressure compressed air supply 118 is being replenished with high pressure compressed air from the high pressure compressed air supply. Bladders 88 can be rapidly inflated and the inflation thereof maintained by the use of the pressurization means which rapidly inflates bladders 88 initially from the high pressure air supply tank 118 and then maintains inflation of bladders 88 by air delivered through the low pressure regulator 124.

Figure 3:
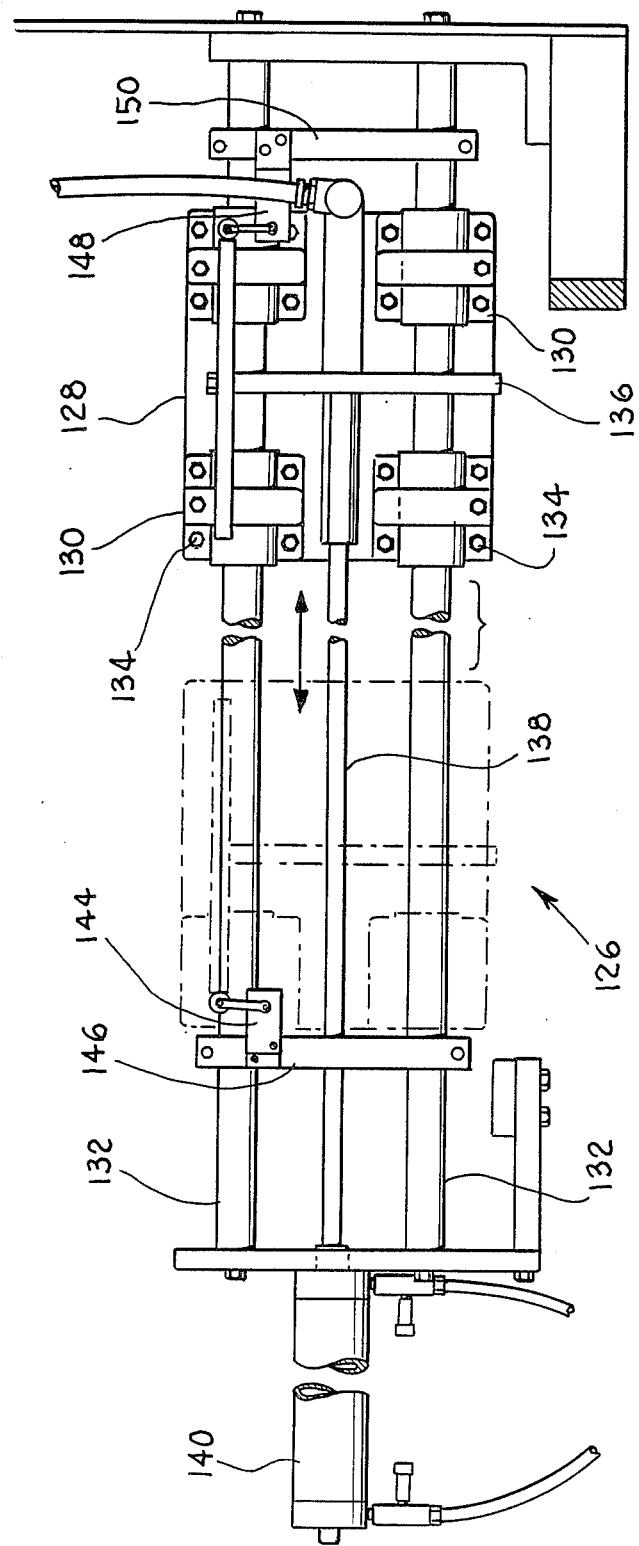
FIG. 3 is a partial side elevational view, with parts cut away, of carriage transfer means constructed in accordance with the present invention.

Carriage D is moved back and forth between receiving station B and towards loading station F by means of carriage transport means generally 126. As illustrated in FIG. 3, carriage transport means includes a sliding truss assembly 128 having ball bearing assemblies 130 attached thereto for sliding onto stationary parallel rods 132. Rods 132 are preferably constructed of hardened steel. Ball bearing assemblies 130 are attached to truss assembly 128 by bolts 134. A spanning member 136 spans across truss assembly 128 between rods 132 and is connected to a shaft 138 extending from a double action pneumatic cylinder 140. Upon actuation of cylinder 140, shaft 138 moves relative to cylinder 140, and acting through spanning member 136, causes corresponding movement of truss assembly 128 with respect to rods 132.

Extending from truss assembly 128 is conduit draw bar 102 which is fixedly attached to truss assembly 128, such that movement of truss 128 causes corresponding movement of conduit draw bar 102. Because frame members 72, 74 of carriage D are connected to conduit draw bar 102, as shown in FIG. 1, via sliding conduit blocks 80, movement of conduit draw bar 102 causes corresponding movement of carriage D. Conduit draw bar 102 has internal passages 142 therein for fluid communication with internal passages 82 of sliding conduit blocks 80 such that the pressurization means and depressurization means may act therethrough to inflate and deflate bladders 88.

A limit switch 144 is provided on a bridge member 146, disposed between rods 132, for sensing the proximity of truss assembly 128 thereto. When limit switch 144 is tripped by truss assembly 128, carriage D is in proper position for engaging containers 12 disposed at receiving station B. Double action pneumatic cylinder 68 is signalled to retract pivoting bars 58, and the pressurization means is signaled accordingly for inflating bladders 88 for gripping containers 12 to carriage D. Upon advancement of carriage D from receiving station B towards loading station F, truss assembly 128 pushes a limit switch 148 attached to a bridge member 150, which is disposed between rods 132. When limit switch 148 is tripped, double action pneumatic cylinder 68 is actuated to return pivoting bars 58 to a restraining position from the retracted position assumed thereby when limit switch 144 was tripped earlier. Also, the tripping of limit switch 148 actuates the depressurization means to deflate bladders 88 for releasing containers 12 from carriage D.

Loading station F is an area above a conventional grid structure 152 through which the containers 12 pass upon being released from carriage D when bladders 88 are deflated. Grid structure 152 includes individual compartments 154 for accommodating individual containers 12. Downwardly extending fingers 156 are provided each compartment 154 for guiding containers 12 into spaces 158 defined by partitions 160 of a case 162. Grid structure 152 may be lowered from a position directly below carriage D to a position such that fingers 156 extend into spaces 158 of case 162 for delivering containers 12 therein. Case 162 is delivered beneath grid structure 152 by conventional case conveying means 164, illustrated in FIG. 4 as having cylindrical rollers 166.

The operation of case packing machine 10 having a article transport apparatus constructed in accordance with of the present invention incorporated therein will now be discussed. Containers 12 are propelled from a conventional article supply source (not shown), such as an upstream container filling and/or sealing machine, by conveyor belt 14. Conveyor belt 14 conveys containers 12 through lanes 27, 29, and 31 between lane dividers 26, 28, 30, and 32. Upon reaching terminus 33 of conveyor belt 14, containers 12 are moved onto endless conveyor members 34, which are preferably comprised of roller chains 36. Endless conveyor members 34 continue to propel containers 12 through lanes 27, 29 and 31, with containers 12 being moved above upper surfaces 44 of channel members 38. Upon reaching the ends of endless conveyor members 34, containers 12 are restrained from further movement by pivoting bars 58 being in a restraining position.

Carriage D moves forward to encompass a predetermined number of containers 12 situated at receiving station B when receiving station B is full, as sensed by a conventional sensing means such as a photocell device (not shown). When carriage D is in such a position, sliding truss assembly 128 is adjacent bridge member 146, which causes limit switch 144 to be tripped. Upon the tripping of limit switch 144, the pressurization means is activated such that bladders 88 are immediately inflated to a state as illustrated in FIG. 8 by high pressure air blowing from high pressure compressed air supply tank 118 until the high pressure air from air supply tank 118 is substantially exhausted. Immediately prior to activation of the pressurization means, the depressurization means is deactivated by the tripping of limit switch 144. After initial inflation of bladders 88 by the high pressure air, low pressure regulated air is supplied through low pressure regulator 124, to maintain inflation of bladders 88. The inflation of bladders 88 causes the sides of containers 12 to be gripped thereby for fixing containers 12 to carriage D. If carriage D is configured for elimination of shingling of containers 12, wherein bladders 88 are provided alternatingly with rail members 117 as discussed above, then upon inflation of bladders 88, shingling or overlapping of containers 12 will be eliminated as illustrated in FIG. 9.

After inflation of bladders 88 and the corresponding fixing of containers 12 to carriage D, carriage D moves substantially rectilinearly under the influence of double action pneumatic cylinder 140, to a position at loading station F. When carriage D is at loading station F, sliding truss assembly 128 is adjacent bridge member 150 and trips limit switch 148. Upon the tripping of limit switch 148, the depressurization means is activated such that vacuum pump 120 pulls air from bladders 88 for deflation thereof, thereby causing bladders 88 to release containers 12 from carriage D. Upon release of containers 12 from carriage D, containers 12 fall into grid structure 152, and carriage D advances forward again to encompass a new group of containers 12 at receiving station B.

Referring again to limit switch 144 adjacent receiving station B, when limit switch 144 is tripped by sliding truss assembly 128, pivoting bars 58 are actuated by double action pneumatic cylinder 68 such that pivoting bars 58 move from a restraining position, above where endless conveyor members 34 contact the bottoms of containers 12, to a retracted position below endless conveyor members 34. When carriage D approaches loading station F, limit switch 148 is tripped, which causes pivoting bars 58 to return through an arcuate path to the restraining position thereof.

Carriage D moves away from conveyor belt 14 at a faster rate than the travel rate of conveyor belt 14. Thus, as carriage D moves from receiving station B with a group of containers 12, a container-free space, or gap, is created between containers 12 on conveyor belt 14 and containers 12 carried by carriage D. It is through this gap that pivoting bars 58 pivot unimpeded.

Once containers 12 have been dropped into grid structure 152, containers 12 can be loaded into a case 162 in a conventional manner, such as by lowering grid structure 152 to case 162 or by bringing case 162 up to grid structure 152.

Conventional case sensing means (not shown) are provided for sensing whether an empty case 162 is in position for loading beneath grid structure 152. If an empty case 162 is not present, carriage D will not drop containers 12 at loading station F.

Figure 11:
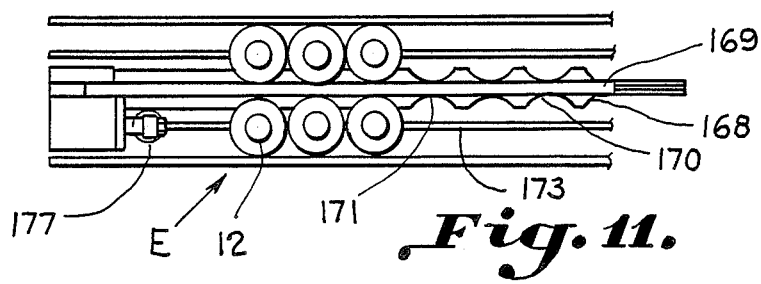
FIG. 11 is a partial plan view of an alternate embodiment engagement means constructed in accordance with the present invention.
Figure 12:
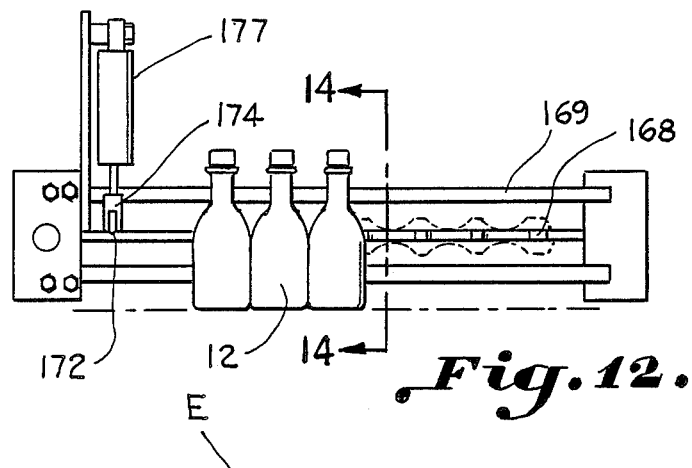
FIG. 12 is a side elevational view of the alternate embodiment engagement means shown in FIG. 11.
Figure 14:
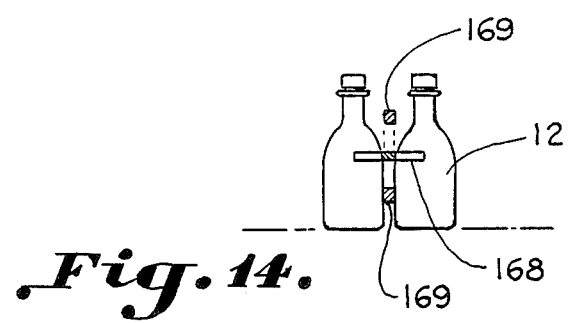
FIG. 14 is a sectional view along lines 14—14 of FIG. 12.

Referring to FIGS. 11, 12, and 14, an alternate embodiment of container engagement means E is illustrated. In the alternate embodiment, container engagement means E includes a scalloped swinging gate member 168 which swings from a substantially vertical position between slats 169, as shown in phantom in FIG. 12, to a substantially horizontal engaging position for allowing scalloped portions 171 to engage containers in adjacent lanes between frame members 72, 74 of carriage D. Swinging gate member 168 may be provided with a protective surface or member 170 which can be constructed of rubber, plastic, metal, wood, or any other suitable material. Protective member 170 protects the surface of containers 12 upon the swinging of gate member 168 into engagement therewith. A pivotal arm 172 is connected to swinging gate member 168 by pivotal connector 174. Pivotal arm 172 can be actuated in a conventional manner, for example by a pneumatic cylinder assembly 177 similar to that used for actuating pivoting bars 58. Swinging gate member 168 would find use particularly in applications where containers 12 are not prone to overlapping or shingling while in the lanes of case packing machine 10. When using swinging gate member 168, conventional actuable support bars 173 would normally be required to support containers 12 as containers 12 are brought by swinging gate member 178 to a position over grid structure 152, since containers 12 are not held with carriage D as when bladders 88 are used.

Figure 13:
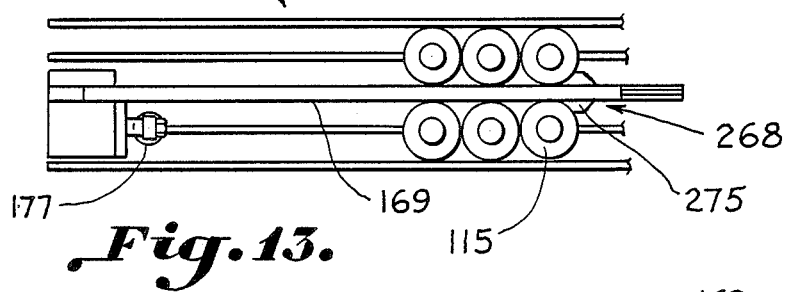
FIG. 13 is a partial plan view of a further alternate embodiment engagement means constructed in accordance with the present invention.

FIG. 13 illustrates a further alternate embodiment of article engagement means E constructed in accordance with the present invention. A swinging gate member 268 which operates similarly as does swinging gate member 168 is provided having winged portions 275 for engaging a reference container 115 in each lane. As article engagement means E moves towards grid structure 152, the reference container 115 in each lane is engaged, and those containers 12 downstream of reference containers 115 are pulled forward by, and along with, reference containers 15. Swinging gate member 268 is particularly useful for transferring containers 12 from conveying means A which are pliable and which may become deformed on conveying means A due to upstream line pressure. This is so because only winged portions 275 must be inserted between adjacent containers 12 on conveying means 12, contrary to the plurality of scalloped portions 171 of swinging gate member 168 which must be simultaneously inserted between a plurality of containers 12 in each of the lanes. Swinging gate member 268 can also be used for either rigid or pliable containers 12.

One advantage of the present invention is that bladders 88 can be constructed of a length such that upon inflation thereof, only a predetermined number of containers 12 are grasped. Such a feature allows for a specified number of containers 12 to be grasped by each container pick-up of carriage D. Because the number of containers 12 which are grasped by each container pick-up of carriage D can be built into the present article transport apparatus by constructing bladders 88 of a specific length, the need for separate means for counting a group of containers 12 to be loaded into grid structure 152 is eliminated. Counting of a predetermined number of containers 12 to be loaded in a case 162 is thus an inherent function of the construction of carriage D and bladders 88 associated therewith.

Another advantage of the present invention is that actuatable container support bars (not shown) commonly provided a grid structure for supporting containers prior to dropping into a case can be eliminated by the use of bladders 88. Bladders 88 support containers 12 until containers 12 are dropped through grid structure 152, thereby taking over the function of the actuatable bars.

A further advantage of the present invention is that a wide variety of container shapes can be grasped by bladders 88, including square, rectangular, and irregularly shaped containers.

Carriage D preferably moves substantially rectilinearly between receiving station B and loading station F in such a rapid manner that the container packing output of case packing machine 10 is substantially increased without increasing the rate of travel of conveyor belt 14. Conversely, the rate of conveyor belt 14 can be substantially slowed, while maintaining the same container packing output, with the use of the present article transport apparatus. This allows for a reduction of conveyor line pressure on containers 12 during the packing operation, a reduction of impact forces generated through container-to-container contact, and a corresponding reduction in container damage. Also, a reduction in the amount of relative movement between conveyor belt 14 and the bottoms of containers 12 as containers 12 are stationed for pick-up by carriage D at receiving station B is realized. Further, carriage D eliminates the need for a dead plate (not shown) on which containers 12 would reside while awaiting to be packed into cases because carriage D moves containers 12 directly from conveyor belt 14 to loading station F. Accordingly, a means for stopping containers on the dead plate prior to loading (not shown) is also eliminated. Carriage D can be reciprocated at a rate such that containers 12 are picked up in a group of a specified number just as that group is being formed at receiving station B due to the infeed of containers 12 from conveyor belt 14.

It is to be understood that other types of engagement means could be provided carriage D besides bladders 88. For example, an engagement rail (not shown) could be provided frame member 72, 74 for pivoting or moving laterally to contact with containers 12 encompassed by frame members 72, 74 which would press containers 12 against an opposing frame member 72, 74 to lock containers 12 with carriage D. Further, a single pin, finger, bladder, or other such means (none shown), could also be provided adjacent the receiving end 176 of carriage D for merely engaging the end containers 178 for fixing end containers 178 to carriage D such that the containers 12 between end containers 178 and conduit draw bar 102 are pulled forward with carriage D as carriage D approaches loading station F. This would necessitate the grabbing of only the one end container 178 in each lane 27, 29, and 31 for transporting all of container 12 with carriage D.

Case packing bladders (not shown) similar to bladders 88 could be provided case packing machine 10 for use in the transferring of containers 12 from carriage D to an empty case 162. The case packing bladders would grip lower portions of containers 12 over case 162 before bladders 88 released containers 12 from carriage D. The case packing bladders would then lower containers 12 towards a case 162 and release them for allowing containers 12 to pass through a grid structure into spaces 158 of case 162.

While a preferred embodiment of the invention has been described using specific terms, such description is for illustrative purposes only, and it is to be understood that changes and variations may be made without departing from the spirit or scope of the following claims.

What is claimed is:

1. A case packing apparatus for loading groups of articles into cases, the articles having top, bottom, and side portions, the case packing apparatus comprising:
   conveying means for supplying a flow of articles in a plurality of aligned rows in a predetermined direction;
   a receiving station for receiving articles supplied by said conveying means in said plurality of aligned rows;
   a loading station for loading articles in said plurality of aligned rows into cases;
   a carriage movable between said receiving station and said loading station for carrying articles in said plurality of aligned rows from said receiving station to said loading station, said carriage defining a receiving end having article passageways through which articles may be received;
   carriage transfer means for moving said carriage to a receiving position in a direction opposite said predetermined direction of said flow of articles supplied by said conveying means for causing said receiving end of said carriage to receive articles, thereby allowing said carriage to encompass a predetermined number of articles at said receiving station;
   article engagement means carried by said carriage for selectively engaging articles encompassed by said carriage and for substantially fixing the articles to said carriage for movement therewith;
   said carriage transfer means moving said carriage to said loading station in substantially said predetermined direction of said flow of articles supplied by said conveying means, after engagement of said article engagement means with the articles encompassed by said carriage;
   means for disengaging said article, engagement means for depositing articles carried by said carriage at said loading station; and
   loading means associated with said loading station for loading the articles deposited at said loading station into cases.

2. A case packing apparatus as defined in claim 1, wherein substantially the entire motion of said carriage between said receiving station and said loading station is generally rectilinear.

3. A case packing apparatus as defined in claim 1, wherein said carriage transfer means includes:
   reciprocating actuation means attached to said carriage for moving said carriage between said receiving station and said loading station; and
   switch means associated with said receiving station and said loading station for activating said reciprocating actuation means upon said carriage moving into proximity with said receiving station and upon said carriage moving into proximity with said loading station.

4. A case packing apparatus as defined in claim 1, wherein said engagement means includes actuatable longitudinally extending gripping means attached to said carriage for receiving the articles, said actuatable longitudinally extending gripping means upon actuation gripping the articles in said plurality of aligned rows for substantially fixing the articles with respect to said carriage.

5. A case packing apparatus as defined in claim 1, wherein said engagement means includes fluid pressurizable means attached to said carriage, said fluid pressurizable means engaging upon pressurization thereof the articles for substantially fixing the articles with respect to said carriage, allowing movement of the articles with said carriage; said fluid pressurizable means allowing upon depressurization thereof for said carriage to move relative to the articles; and said fluid pressurizable means being pressurized when said carriage is at said receiving station and depressurized when said carriage is at said loading station.

6. A case packing apparatus as defined in claim 5, further comprising:
   pressurization means connected to said fluid pressurizable means for pressurizing said fluid pressurizable means;
   depressurization means connected to said fluid pressurizable means for depressurizing said fluid pressurizable means; and
   switch means associated with said receiving station and said loading station for activating said pressurization means upon said carriage moving into proximity with said receiving station for pressurizing said fluid pressurizable means, said switch means activating said depressurization means upon said carriage moving into proximity with said loading station for depressurizing said fluid pressurizable means.

7. A case packing apparatus as defined in claim 6, wherein said pressurization means includes a first pressurized fluid source of a first predetermined pressure and a second pressurized fluid source of a second predetermined pressure, said first predetermined pressure being of higher pressure than said second predetermined pressure; said first pressurized fluid source being for an initial pressurization of said fluid pressurizable means upon said carriage moving into proximity with said receiving station, and said second pressurized fluid supply source being for pressurization of said fluid pressurizable means after said initial pressurization of said fluid pressurizable means by said first pressurized fluid source.

8. A case packing apparatus as defined in claim 6, wherein said depressurization means includes a fluid receiver communicating with said fluid pressurizable means for depressurizing said fluid pressurizable means by receiving said pressurized fluid therefrom upon said carriage moving in proximity with said loading station.

9. A case packing apparatus as defined in claim 1, further comprising:
- pivoting means associated with said conveying means for pivoting through an arcuate path to contact the articles for restraining movement thereof by said conveying means; said pivoting means pivoting between a restraining position for said contact with the articles and a retracted position away from said conveying means for allowing the articles to be transferred by said conveying means;
- actuation means attached to said pivoting means for pivoting said pivoting means in said arcuate path between said restraining position and said retracted position; and
- said movement of said carriage providing a gap in said flow of articles transferred by said conveying means through which said pivoting means may pivot generally unimpeded for contacting the articles.

10. A case packing apparatus as defined in claim 9, wherein said pivoting means is situated generally below said conveying means when in said retracted position and wherein said pivoting means is situated generally above said conveying means when in said restraining position, said pivoting means pivoting upwardly from said retracted position in said arcuate path to said restraining position.

11. A case packing apparatus as defined in claim 1, further comprising:
- a plurality of partitions associated with said receiving station which define a plurality of individual lanes;
- an endless conveyor member provided in each of the plurality of individual lanes which extends between the partitions defining the individual lane, said endless conveyor member frictionally contacting the articles for transporting the articles thereon along the individual lane in which said endless conveyor member is provided;
- drive means connected to each said endless conveyor member for moving each said endless conveyor member along the individual lane in which each said endless conveyor member is provided; and
- means for rigidly fixing lower portions of the partitions with respect to one another for allowing the articles to be freely transported between the partitions by the endless conveyor members.

12. A case packing apparatus as defined in claim 11, wherein said endless conveyor member is a roller chain.

13. A case packing apparatus as defined in claim 1, wherein said article engagement means engages articles closest to said receiving end of said carriage after the articles are encompassed by the carriage.

14. A case packing apparatus as defined in claim 1, wherein said article engagement means engages the side portions of the articles encompassed by the carriage for substantially fixing the articles to the carriage.

15. A case packing apparatus as defined in claim 1, wherein said article engagement means includes at least one substantially rigid mechanical member for selectively engaging the articles encompassed by the carriage for substantially fixing the articles to said carriage.

16. The case packing apparatus as defined in claim 4, wherein said predetermined number of articles encompassed by said carriage is dependent on the length of said longitudinally extending gripping means of said article engagement means.

17. The case packing apparatus as defined in claim 1, wherein said article engagement means maintains the articles in an ordered, non-overlapping configuration when the articles are carried by said carriage.

18. The case packer as defined in claim 1, wherein said carriage transfer means makes said carriage between said receiving station and said loading station faster than said flow of articles supplied by said conveying means.

19. A case packing apparatus for loading groups of articles into cases, the articles having engageable side portions, the case packing apparatus comprising:
- conveying means for supplying a flow of articles in a predetermined direction;
- a receiving station for receiving articles supplied by said conveying means;
- a loading station for loading groups of articles into cases;
- a carriage movable between said receiving station and said loading station for carrying groups of articles from said receiving station to said loading station;
- carriage transfer means for moving said carriage to a receiving position in a direction opposite said predetermined direction of said flow of articles supplied by said conveying means for causing said carriage to encompass a predetermined number of articles at said receiving station; said carrrage transfer means moving said carriage to said loading station in substantially said predetermined direction of said flow of articles supplied by said conveying means;
- said carriage transfer means moving said carriage to said loading station in substantially said predetermined direction of said flow of articles supplied by said conveying means; and
- fluid pressurizable means attached to said carriage, said fluid pressurizable means engaging the engageable side portions of the articles upon pressurization thereof for substantially fixing the articles with respect to said carriage, allowing movement of the articles with said carriage; said fluid pressurizable means allowing upon depressurization thereof for said carriage to move relative to the articles; and said fluid pressurizable means being pressurized when said carriage is at said receiving station and depressurized when said carriage is at said loading station.

20. A container packing apparatus for packing a container with articles, the container packing apparatus comprising:
- conveying means for supplying a flow of articles at a predetermined conveyance rate;
- article restraining means for contacting the articles for restraining movement thereof by said conveying means; said article restraining means moving between a restraining position for contacting the articles and a retracted position away from said conveying means for allowing the articles to be transferred by said conveying means;

actuation means attached to said article restraining means for moving said article restraining means between said restraining position and said retracted position;

article spacing means associated with said conveying means for moving articles from said conveying means at a rate faster than said predetermined conveyance rate and for providing a gap between the articles transferred by said conveying means and the articles moved by said article spacer means in which said article restraining means may move generally unimpeded for contacting the articles on said conveying means; and a loading station for receiving articles moved by said article spacer means and for loading the articles into the containers.

21. A case packing apparatus as defined in claim 20, wherein said article spacer means includes:

an engagement surface mounted for movement relative to said conveying means;

engaging means spaced from said engagement surface for receiving the articles therebetween;

support means attached to said engaging means for allowing corresponding movement of said engaging means with said movement of said engagement surface; and actuation means provided said engaging means for allowing engagement and disengagement of said engaging means with the articles, said engagement of said engaging means with the articles allowing the articles to be forced against said engagement surface for substantially fixing the articles between said engagement surface and said engaging means, and said disengagement of said engaging means with the articles allowing said engagement surface to move relative to the articles.

22. A case packing apparatus for loading groups of articles into cases, the case packing apparatus comprising:

conveying means for supplying a flow of articles in a plurality of aligned rows in a predetermined direction;

a receiving station for receiving articles supplied by said conveying means in said plurality of aligned rows;

a loading station for loading articles in said plurality of aligned rows into cases;

a carriage movable between said receiving station and said loading station for carrying articles in said plurality of aligned rows from said receiving station to said loading station, said carriage defining an open receiving end through which articles may be received;

fluid pressurizable means attached to said carriage for engaging upon pressurization thereof the articles for substantially fixing the articles with respect to said carriage, allowing movement of the articles with said carriage; said fluid pressurizable means allowing upon depressurization thereof for said carriage to move relative to the articles; said fluid pressurizable means being pressurized when said carriage is proximate said receiving station and depressurized when said carriage is proximate said loading station;

pivoting means for pivoting through an arcuate path to contact the articles for restraining movement thereof by said conveying means; said pivoting means pivoting between a restraining position for said contact with the articles and a retracted position for allowing the articles to be transferred by said conveying means, said pivoting means being situated generally below said conveying means when in said retracted position and situated generally above said conveying means in said restraining position, said pivoting means pivoting upwardly from said retracted position in said arcuate path to said restraining position;

said carriage providing a gap between the articles transferred by said conveying means through which said pivoting means may pivot generally unimpeded for contacting the articles;

a plurality of partitions associated with said receiving station defining a plurality of individual lanes; and an endless conveyor member provided in each of the plurality of individual lanes which extends between the partitions defining the individual lane, said endless conveyor member frictionally contacting the articles for transporting the articles thereon along the individual lane in which said endless conveyor member is provided.

23. A container packing device for packing a container with articles in an ordered configuration, the container packing device comprising:

conveying means for conveying a stream of articles;

a receiving station for receiving articles conveyed by said conveying means;

a loading station for loading articles in said ordered configuration into cases;

a plurality of partitions associated with said receiving station which define a plurality of individual lanes;

an endless conveyor member provided in each of said plurality of individual lanes which extends between said partitions defining said individual lanes, said endless conveyor member frictionally contacting the articles for transporting the articles thereon along said individual lane in which said endless conveyor member is provided;

drive means connected to each said endless conveyor member for moving each said endless conveyor member along said individual lane in which each said endless conveyor member is provided;

means for rigidly fixing lower portions of said partitions with respect to one another for allowing the articles to be freely transported between said partitions by the endless conveyor member; and a carriage associated with said plurality of individual lanes for moving substantially upstream in relation to said stream of articles for receiving the articles from said receiving station and moving substantially downstream in relation to said stream of articles for transporting the articles to said loading station by intermittently reciprocating therebetween.

24. A case packing apparatus for loading groups of articles into cases, comprising:

conveying means for supplying a flow of articles in a predetermined direction;

a receiving station for receiving articles supplied by said conveying means;

a loading station for loading groups of articles into cases;

a carriage movable between said receiving station and said loading station for carrying groups of articles from said receiving station to said loading station;

carriage transfer means for moving said carriage to a receiving position in a direction opposite said predetermined direction of said flow of articles supplied by said conveying means for causing said carriage to receive articles, thereby allowing said carriage to encompass a predetermined number of articles at said receiving station; said carriage transfer means moving said carriage to said loading station in substantially said predetermined direction of said flow of articles supplied by said conveying means; and actuatable longitudinally extending gripping means attached to said carriage for receiving the articles, said actuatable longitudinally extending gripping means upon actuation gripping the articles in said plurality of aligned rows for substantially fixing the articles with respect to said carriage.

* * * * *

UNITED STATES PATENT OFFICE
CERTIFICATE OF CORRECTION

Patent No. 4,709,536         Dated    December 1, 1987

Inventor(s)     Hartness et al.

It is certified that error appears in the above-identified patent and that said Letters Patent are hereby corrected as shown below:

It is certified that error appears in the above-identified patent and that said Letters Patent are hereby corrected as shown below:

Column 14, line 2, insert after "carriage;" --said carriage transfer means providing a gap in the articles between said flow of articles transferred by said conveying means and those articles carried by said carriage as said carriage moves from said receiving station towards said loading station;

article restraining means for moving in said gap in the articles created by said carriage transfer means to selectively contact articles on said conveying means for restraining movement thereof by said conveying means;--

Column 15, line 14, delete "further comprising" and insert --wherein-- therefore;

line 15, insert --said article restraining means includes a-- before "pivotting";

line 15, delete "means" (first occurrence) and insert --member-- therefor;

line 18, delete "means" (second occurrence) and insert --member-- therefor;

line 22, insert --and-- after "means;";

line 23, delete "means" (second occurrence) and insert --member-- therefor;

UNITED STATES PATENT OFFICE
CERTIFICATE OF CORRECTION

Patent No. 4,709,536    Dated December 1, 1987

Inventor(s)  Hartness et al.

It is certified that error appears in the above-identified patent and that said Letters Patent are hereby corrected as shown below:

line 24, delete "means" and insert --member-- therefor;
line 26, delete "; and said movement of said carriage providing a gap in said flow of articles transferred by said conveying means through which said pivoting means may pivot generally unimpeded for contacting the articles";

line 33, delete "means" and insert --member-- therefor;

line 35, delete "means" and insert --member-- therefor;

line 37, delete "means" and insert --member-- therefor.

Column 16, line 16, delete "makes" and insert --moves-- therefor;
line 38, delete "said carriage transfer means moving said carriage to said loading station in substantially said predetermined direction of said flow of articles supplied by said conveying means;";

line 46, delete "and" and insert therefor --said carriage transfer means providing a gap in the articles between said flow of articles transferred by said conveying means and those articles carried by said carriage as said carriage moves from said receiving station towards said loading station;

article restraining means for moving in said gap in the articles created by said carriage transfer means to selectively contact articles on said conveying means for restraining movement thereof by said conveying means; and --.

UNITED STATES PATENT OFFICE
CERTIFICATE OF CORRECTION

Patent No. 4,709,536  Dated December 1, 1987

Inventor(s) Hartness et al.

It is certified that error appears in the above-identified patent and that said Letters Patent are hereby corrected as shown below:

Column 20, line 3, after "means;", insert --said carriage transfer means providing a gap in the articles between said flow of articles transferred by said conveying means and those articles carried by said carriage as said carriage moves from said receiving station towards said loading station;

article restraining means from moving in said gap in the articles created by said carriage transfer means to selectively contact articles on said conveying means for restraining movement thereof by said conveying means;--.

Signed and Sealed this

Tenth Day of May, 1988

Attest:

DONALD J. QUIGG

Attesting Officer

Commissioner of Patents and Trademarks